(12) United States Patent
May (10) Patent No.: US 7,447,924 B2
(45) Date of Patent: Nov. 4, 2008

(54) METHOD AND APPARATUS FOR POWER SUPPLY ADJUSTMENT WITH INCREASED SLEWING

(75) Inventor: Marcus W. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 428 days.

(21) Appl. No.: 11/231,634

(22) Filed: Sep. 21, 2005

(65) Prior Publication Data
US 2007/0067651 A1 Mar. 22, 2007

(51) Int. Cl.
G06F 1/00 (2006.01)
G06F 11/30 (2006.01)
(52) U.S. Cl. .................................. 713/300; 713/340
(58) Field of Classification Search .............. 713/300, 713/340
See application file for complete search history.

(56) References Cited

U.S. PATENT DOCUMENTS

| | | | | |
|---|---|---|---|---|
| 5,812,860 A | * | 9/1998 | Horden et al. .............. 713/322 |
| 5,867,715 A | * | 2/1999 | Lin et al. .................. 713/300 |
| 6,031,362 A | * | 2/2000 | Bradley ................... 323/269 |
| 6,204,651 B1 | * | 3/2001 | Marcus et al. .............. 323/283 |
| 6,744,243 B2 | * | 6/2004 | Daniels et al. ............. 323/284 |
| 2004/0199799 A1 | * | 10/2004 | Flynn ...................... 713/300 |
| 2005/0088466 A1 | * | 4/2005 | Smith et al. ................. 347/5 |

* cited by examiner

Primary Examiner—Thomas Lee
Assistant Examiner—Ji H Bae
(74) Attorney, Agent, or Firm—Ingrassia, Fisher & Lorenz, P.C.

(57) ABSTRACT

A power supply includes a switching circuit and a transient control module. The switching circuit is switched in accordance with a regulation signal to produce an output voltage. The adjustable feedback module is operably coupled to produce the regulation signal based on the output voltage. The transient control module adjusts the adjustable feedback module by a step adjust value to produce a present output voltage. The transient control module monitors the adjustable feedback module for a present adjustment to determine when the power supply substantially achieves a steady-state condition. When the power supply substantially achieves a steady-state condition, determining whether the present output voltage corresponds to the second output voltage level. When the present output voltage does not correspond to the second output voltage level, the adjust, the monitor, and the determine steps are repeated.

18 Claims, 6 Drawing Sheets

FIG. 2
power supply 200

FIG. 3

FIG. 4
transient control module 228

FIG. 5
settling detect module 502

METHOD AND APPARATUS FOR POWER SUPPLY ADJUSTMENT WITH INCREASED SLEWING

TECHNICAL FIELD

This invention relates generally to power supplies and more particularly to power supply adjustment to facilitate power consumption efficiency in a portable device.

BACKGROUND

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extensions (commonly referred to as a thumb drive), et cetera. Each of these handheld devices includes one or more integrated circuits to provide the functionality of the device. For example, a thumb drive may include an integrated circuit for interfacing with a computer (for example, personal computer, laptop, server, workstation, et cetera) via one of the ports of the computer (for example, Universal Serial Bus, parallel port, et cetera) and at least one other memory integrated circuit (for example, flash memory).

As another example, an MP3 player may include multiple integrated circuits to support the storage and playback of digitally formatted audio (that is, formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Portable electronic devices that include integrated circuits require at least one DC voltage supply and typically require multiple DC voltage supplies. A DC voltage supply may be generated from a battery or from another DC power source (for example, a 5 volt USB power source). To generate a DC voltage supply from a DC voltage (for example, a battery or a 5 volt USB source), the DC voltage is processed in a controlled manner. For example, using one of a plurality of switch mode converter topologies (such as, full bridge, half bridge, buck, or boost), an inductor is charged and discharged at a controlled rate to produce a regulated DC voltage supply from a DC voltage source.

Device power consumption relates to the supply voltage level and/or to the device clock rate. The regulated DC voltage supply is set at a fixed level to accommodate device applications having the greatest processing speed requirements. But setting the DC voltage supply at this level results in unnecessary power consumption for less power-intensive applications.

Devices are increasingly using diverse applications, with each having different power requirements. As an example, an MP3 encode application has a higher power requirement than an MP3 decode application. Although higher power levels can be used to power applications with lower power requirements, an unnecessary drain results on the battery power supply. While it is desirable to adjust the power supply for different power requirements, it can be onerous to do so because of the amount of oversight by the processing device to implement and to verify changes to the power supply output and the settling time of transients incurred by the changes to the power supply output.

Therefore, a need exists for a method and apparatus for power supply adjustment with increased slewing having a minimal processor oversight and improved response to efficiently accommodate power requirements.

DETAILED DESCRIPTION

Figure 1:
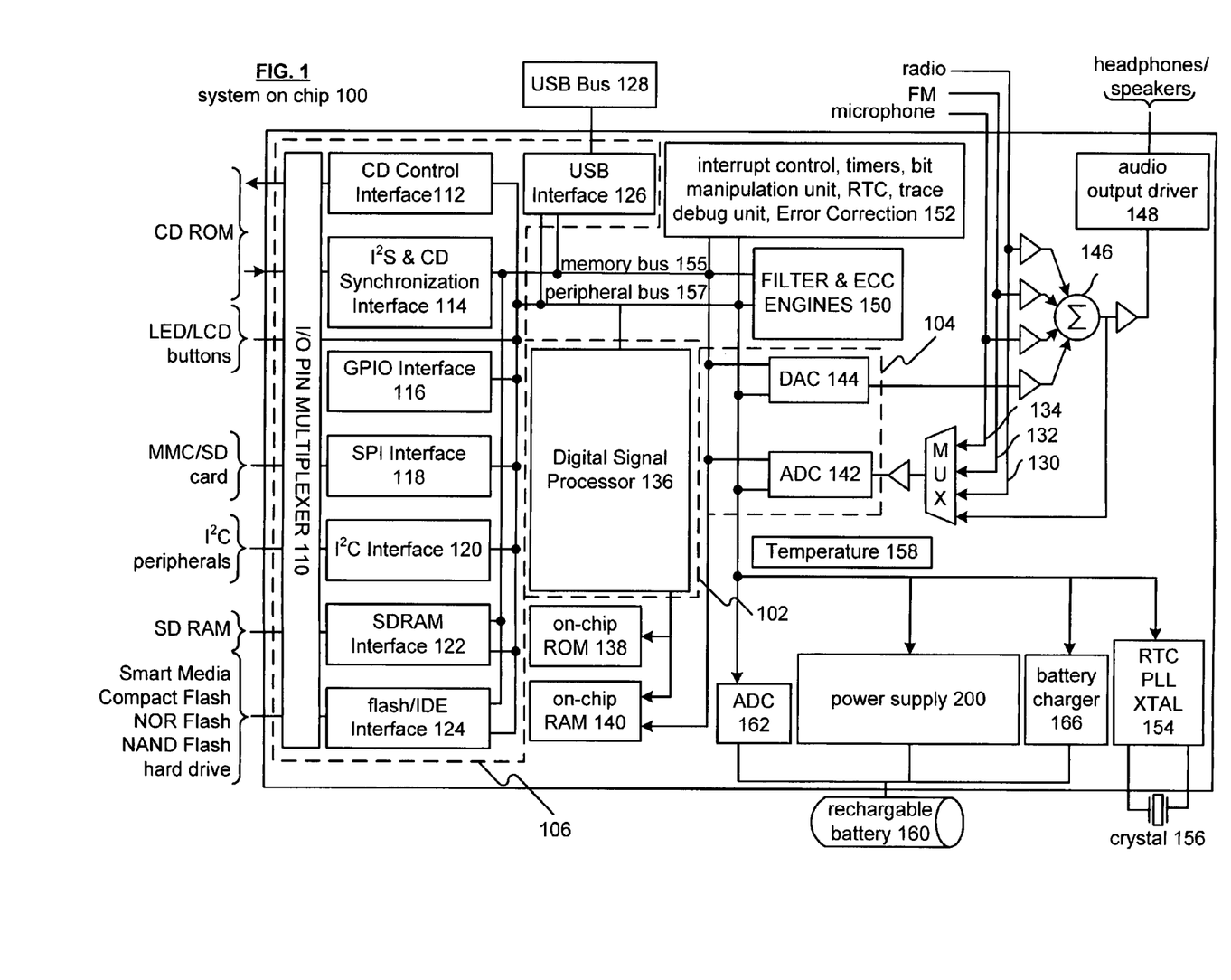
FIG. 1 is a schematic block diagram of a multiple function system-on-a-chip in accordance with the present invention.

FIG. 1 is a schematic block diagram of an example integrated circuit (IC) 100 in which one embodiment of the invention is implemented. The example IC 100 is a single IC chip that implements a multiple function system-on-a-chip. It is to be noted that the example embodiment of FIG. 1 implements a media system on a single chip, but other embodiments of the invention may incorporate one or more integrated circuit chips to provide a system or parts of a system.

As illustrated in FIG. 1, the IC 100 includes a variety of blocks that exemplify hardware components, software and interfaces resident within the IC 100. The example media system of the IC 100 may operate with one or a variety of devices For example, the IC 100 includes a CD (compact disc); LED (Light Emitting Diode)/LCD (Liquid Crystal Display) displays, buttons and/or switches; MMC (Multimedia Card)/SD (Secure Digital) cards; I²C (Inter-Integrated Circuit) peripherals; SmartMedia, Compact Flash, NOR Flash, NAND Flash, and/or hard drive devices; and memory, such as SDRAM (Synchronous Dynamic Random Access Memory) are some components that may be operably coupled to the IC 100 through the digital interface circuitry 106 is provided by an I/O (input/output) pin multiplexer 110. These various multiplexed connections are coupled to respective interfaces and include CD control interface 112; I²S (Inter-IC sound) and CD synchronization interface 114; GPIO (General Purpose Input/Output) interface 116, SPI (Serial Peripheral Interface) interface 118; I²C interface 120; SDRAM interface 122 and Flash/IDE (Integrated Device Electronics) interface 124.

The digital interface circuitry 106 provides a Universal Serial Bus ("USB") interface 126 for the coupling of a USB connection external to IC 100. The USB interface 126 provides compatibility with USB 2.0 specification, and is backwards compatible to a USB 1.1 specification. As should be readily appreciated, the USB interface 126 may be provided for interfacing with additional USB specifications or similar communications protocols as they become available. A microphone input, radio input and a line input are also available on IC 100 via the LINE IN 130, FM IN 132, and MIC IN 134 ports to allow interconnection to a microphone, radio, or other audio input.

The processing core 102 of the IC 100 includes a Digital Signal Processor ("DSP") 136, which may be a 24-bit Digital Signal Processor. An on-chip Read Only Memory ("ROM") 138 and an on-chip Random Access Memory ("RAM") 140 operate as memory for DSP 136. The processing core 102 may also include a microprocessor, micro-controller, microcomputer, central processing unit, field programmable gate array, programmable logic device, state machine, logic circuitry, analog circuitry, digital circuitry, and/or any device that manipulates signals (analog and/or digital) based on operational instructions.

Data stored in the ROM 138 and RAM 140, which may have 64 Mbytes or greater of storage capacity, may be text files, presentation files, user profile information for access to varies computer services (for example, Internet access, email, et cetera), digital audio files (for example, MP3 files, WMA—Windows Media Architecture, MP3 PRO, Ogg Vorbis, AAC—Advanced Audio Coding), digital video files—for example, still images or motion video such as MPEG (motion picture expert group) files, JPEG (joint photographic expert group) files, et cetera—address book information, and/or any other type of information that may be stored in a digital format.

The mixed signal circuitry 104 includes an analog-to-digital converter ("ADC") 142 and a digital-to-analog converter ("DAC") 144. The ADC 142 allows for analog inputs to be converted to digital format for processing by DSP 136. Similarly, the DAC 144 is present to convert digital signals to analog signals that are provided to the audio output driver 148 via the summing module 146. Other analog signals may be summed with the DAC 144 output and/or passed to the audio output driver 148. The audio output driver 148 provides an analog-form output for playback through headphones and/or speakers.

Also included within the IC 100 is a filter and ECC (Error Correction Circuit) engines 150 to provide filtering and error correction operations. Other functions are shown within block 152 to provide various control and timing functions. These may include Interrupt Control, Timers, Bit Manipulation Unit, Real Time Clock ("RTC"), Trace Debug Unit, and error correction just to name a few of the operations.

The IC 100 has a Real Time Clock/Phase Lock Loop ("RTC PLL") circuit 154, which is operably coupled to an external crystal 156 to provide a clocking signal for circuits of the IC 100. Memory and peripheral buses 155 and 157 are also present within the IC 100 for transfer of data and signals. A temperature sensor circuit 158 is present to monitor the temperature of IC 100.

A rechargeable battery 160 is coupled to a lower resolution ADC 162, power supply 200, and battery charger 166. The ADC 162 monitors the battery voltage to determine if the battery voltage is such that battery 160 may require charging or if the battery is fully charged. The ADC 162 may also monitor the battery voltage to determine if a battery is present, as well as sense the output voltage level of the battery. When the battery is not present or is removed during use, IC 100 detects the absence of the battery through the monitoring provided by the ADC 162.

The power supply 200 operates to convert the battery voltage to a regulated operative voltage utilized by the components of the IC 100. The battery charger 166 is utilized to charge the battery when an external voltage source is coupled to the IC 100.

The IC 100 is designed to also operate from other external power sources, when such power sources are coupled to IC 100. One such external power sources may be provided through USB interface 126. Other interface protocols may be implemented, such as Ethernet protocols (such as "Power over Ethernet" under IEEE 802.3af), Firewire under IEEE 1394, et cetera. Increasingly, interface specifications are being generated for direct connection of handheld devices such as Personal Digital Assistants ("PDAs"), cellular phones, MP3 players, and digital cameras to one another without the need for a host PC, in which may provide interface capabilities to the multiple-function system-on-a-chip of the IC 100.

To accommodate applications and their varying power supply requirements, the processing core 102 provides a desired output voltage setting to the power supply 200. For example, a startup application may operate under a voltage setting of 1.73 volts. An MP3 decode application may operate under 1.35 volts for execution at 30 MIPS (Million Instructions Per Second). An MP3 encode application, in contrast, may operate under 1.6 volts for execution at 60 MIPS. Before an application is executed, however, the power supply circuitry substantially achieves or reaches the desired voltage setting. Otherwise, an application error could result due to a timing error caused by an under voltage condition and/or due to power supply noise caused by the transient response introduced by switching from one voltage to another.

Figure 2:
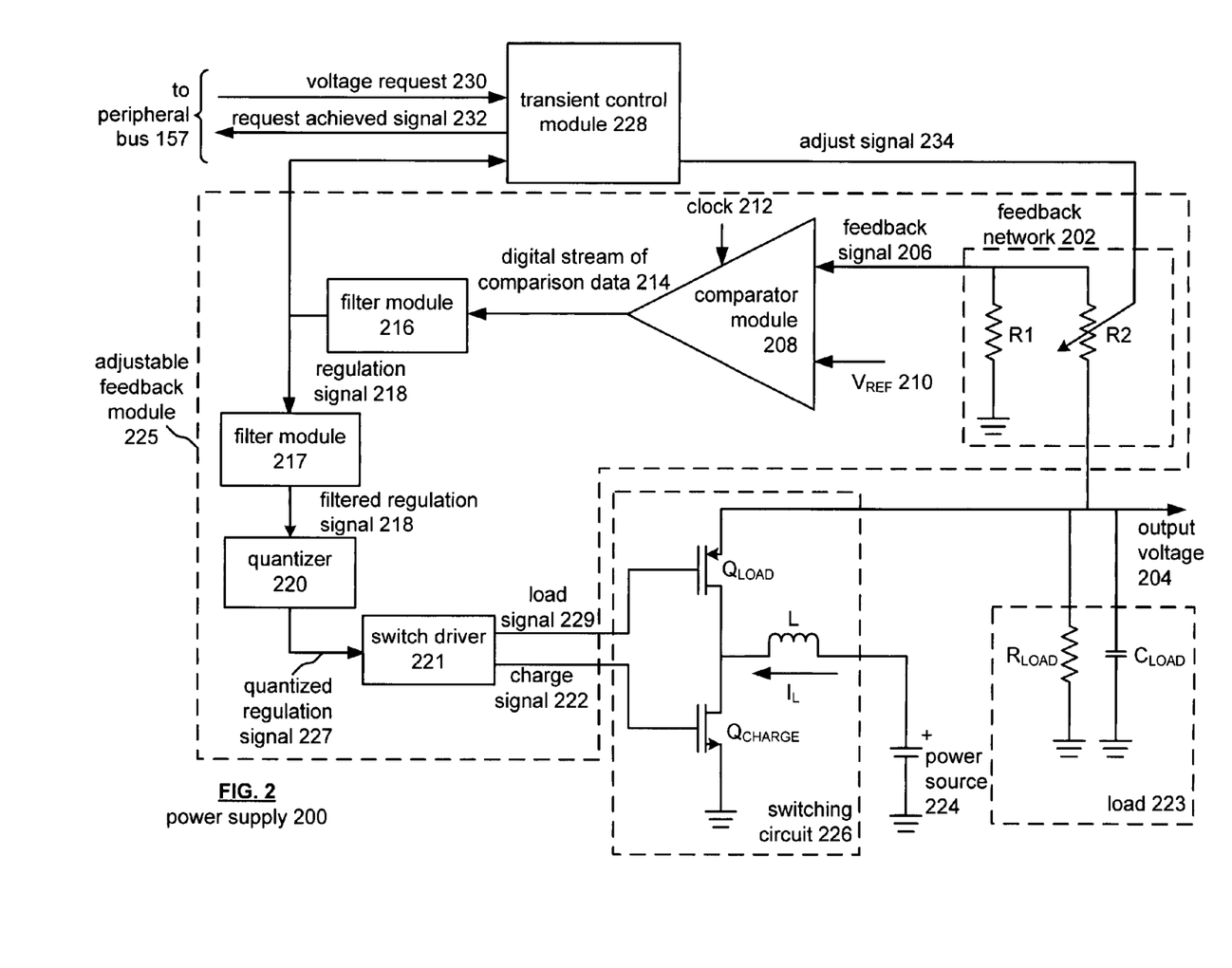
FIG. 2 is a schematic block diagram of power supply circuitry in accordance with the present invention.

FIG. 2 illustrates a schematic block diagram of a power supply that includes a DC-DC converter and a transient control module 228. The DC-DC converter includes an adjustable feedback module 225 and a switching circuit 226 coupled to a load 223, a power source 224, and an inductor L. The adjustable feedback module 225 has a feedback network 202, a comparator module 208, a filter module 216, a filter module 217, a quantizer 220 and a switch driver 221. The switching circuit 226 includes an n-channel transistor $Q_{CHARGE}$, a p-channel transistor $Q_{LOAD}$, that are coupled to the external element L. The load 223 is represented by a resistor $R_{LOAD}$ and a capacitor $C_{LOAD}$. The feedback network 202 has a resistor R1 and an adjustable resistor R2.

In general, the power supply 200 functions to produce one or more output voltages 204 from a power source 224, which may be a battery. To achieve this, the adjustable feedback module 225 compares a representation of the output voltage 204 (for example, the feedback signal 206) with a voltage reference 210. Based on the comparison, the adjustable feedback module 225 generates a charge signal 222 and a load signal 229. The switching circuit 226 charges the inductor L based on the charge signal 222 and discharges the inductor L into the load 223 based on the load signal 229 such that the output voltage 204 is regulated to a desired voltage level. The transient control module 228 is operably coupled to the adjustable feedback module 225 to provide an adjust signal 234, which causes the output voltage 204 to change in a desired manner that requires minimal processor oversight and efficiently accommodates various power consuming applications.

The feedback network 202 has a programmable resistive divider having resistors R1 and R2 that is operably coupled to sense the output voltage 204 and to provide the feedback signal 206. The programmable resistive divider functions to change the impedance of the feedback network 202 based on the adjust signal 234, which is provided by the transient control module 228. The comparator module 208 compares the feedback signal 206 and the voltage reference $V_{REF}$ 210, generating a digital stream of comparison data 214 according the clock 212, serves to produce a digital domain conversion of the comparison from the analog inputs provided to the comparator module 208. The digital stream of comparison data 214 indicates favorable or unfavorable comparison results between the inputs to the comparator module 208.

The filter module 216 receives the digital stream of comparison data 214 provided by the comparator module 208 to produce a regulation signal 218. In operation, the filter 216 uses the most current values of the digital stream of comparison data 214 to readily provide the comparison-result transition(s) (that is, favorable or unfavorable comparisons) to the transient control module 228. The filter module 216 may be provided by a moving-average filter, as well as by a Gaussian filter, a Blackman filter, et cetera. The filter module 217 receives the output of the filter module 216, and provides a filtered regulation signal 219. The filter module 217 is generally configured to provide higher frequency noise filtering and provide feedback path stability for the adjustable feedback module 225. As those of ordinary skill in the art may appreciate, filter module 217 may be provided as an integrator circuit having an output operably coupled to a linearizer-function circuit, as well as other configurations (for example, a resistor-capacitor series configuration). The quantizer 220 quantizes the filtered regulation signal 219 to produce a quantized regulation signal 227. Generally, quantization operates to divide a continuous range of input signal values provided by the filtered regulation signal 219 into non-overlapping sub-ranges, where each sub-range has a corresponding discrete value which in turn is provided through the quantized regulation signal 227. The quantizer 220 may be provided by a sigma-delta modulator circuitry, as well as other circuitry, such as truncation or round-end circuitry. Also, as can be appreciated by those of ordinary skill in the art, the quantized regulation signal 227 may be used to regulate a linear regulator, as well as used with a variety of DC-DC converter circuits.

The switch driver 221 is operably coupled to receive the quantized regulation signal 227. From this input, the switch driver 221 produces a load signal 229 and a charge signal 222, which correspond to a particular set of clock cycles of the clock 212. The ratio between the charge signal 222 and the load signal 229 is based on the desired output voltage, the power source 224 voltage, and to some degree the load 223.

The switching circuit 226 is operably coupled to receive the charge signal 222 and the load signal 229. The p-channel transistor $Q_{LOAD}$ and the n-channel transistor $Q_{CHARGE}$ are operably coupled to the external element L. The p-channel transistor $Q_{LOAD}$ and the n-channel transistor $Q_{CHARGE}$ couple and decouple the external element L between the power source 224 and the output voltage 204 based upon the charge/load information or data of the charge signal 222 and the load signal 229. When the charge signal 222 is enabled (or logic "1"), the n-channel transistor $Q_{CHARGE}$ is enabled, while the p-channel transistor $Q_{LOAD}$ is disabled. In this configuration, the external element L is coupled across the power source 224 and thus is receiving a current $I_L$. When the charge signal 222 is disabled (or logic "0"), the p-channel transistor $Q_{LOAD}$ of the switching circuit is turned on, while the n-channel transistor $Q_{CHARGE}$ of the switching circuit is disabled. Accordingly, the external element L is coupled to the output voltage 204 and the load 223, such that the external element L is discharging energy into the load 223, providing a regulated—that is, a substantially constant and steady-voltage level to the components of the IC 100.

In operation, the transient control module 228 generates the adjust signal 234, based on the regulation signal 218 and the voltage request 230, to adjust the output voltage 204 from one voltage level to another. The adjust signal 234 is a step adjust value that adjusts the present output voltage to another by a step adjust value having a predetermined amount (for example, 32 milli-volts). This predetermined amount is selected to provide a predictable transient response of the power supply 200. Upon the controlled adjustment of the feedback network 202, a corresponding increase or decrease in the feedback signal results, causing the adjustable feedback module 225 to compensate by changing the output voltage 204, via the switching circuit 226, to achieve a favorable comparison of the feedback signal 206 with the voltage reference $V_{REF}$ 210. When the output voltage 204 settles per the predictable transient response, the transient control module 228 determines whether the output voltage 204 is at the desired level. When not at the desired level, another adjustment by the adjust signal 234 to the output voltage 204, via an additional step adjust value. As those of ordinary skill in the art may appreciate, the present output voltage value may also be the actual output voltage, the feedback signal 206, or some other representation of the output voltage. When the output voltage 204 is at the desired level, the request achieved signal 232 is generated.

As one of ordinary skill in the art will appreciate, while the discussion of FIG. 2 was directed towards a DC-DC boost converter topology, the transient control module 228 may be used to adjust the feedback loops of other DC-DC converter topologies such as buck, fly-back, half bridge, and full bridge.

Figure 3:
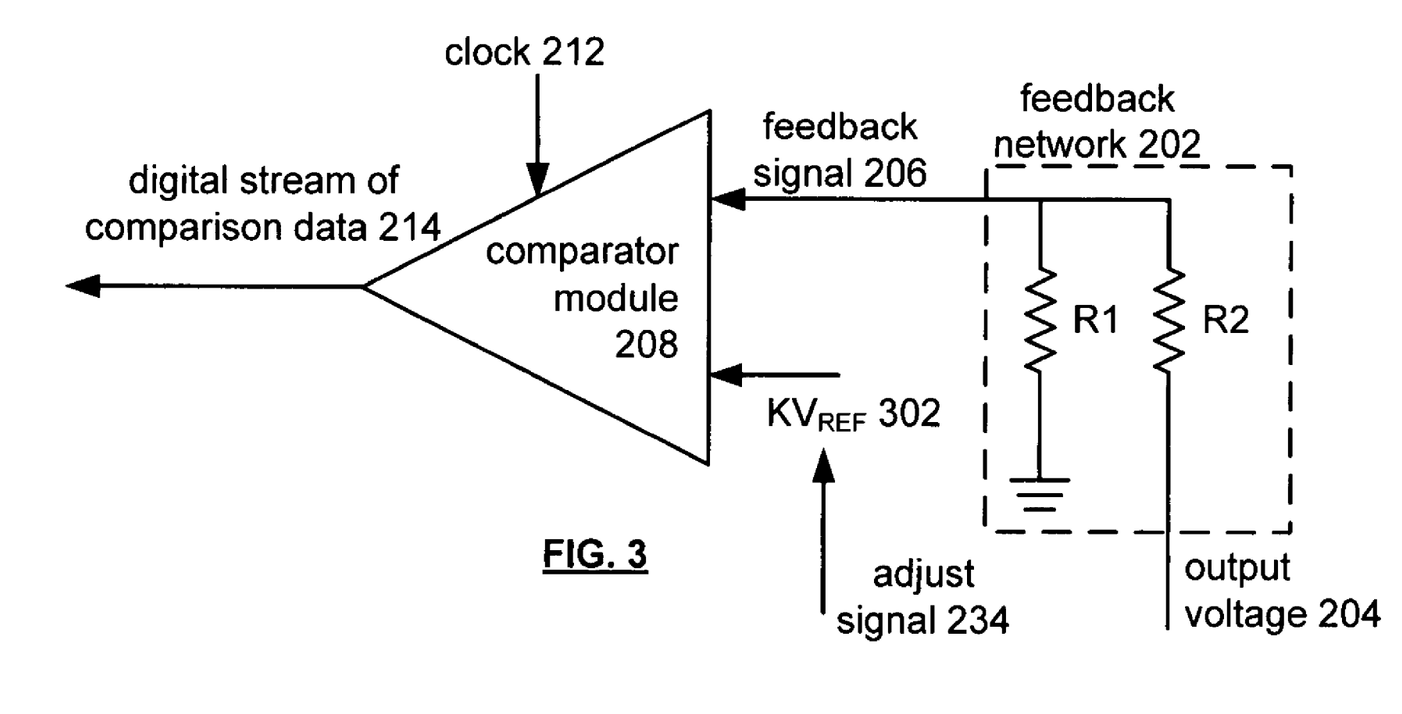
FIG. 3 is a schematic block diagram of an embodiment of a portion of an adjustable feedback module in accordance with the present invention.

FIG. 3 illustrates a schematic block diagram of another embodiment of the feedback network 202 and the comparator module 208. As shown, the feedback network 202 is operably coupled to an output voltage 204. The feedback network 202 has resistive-divider resistors R1 and R2 that sense the output voltage to provide a feedback signal 206. The comparator module 208 receives the feedback signal 206, which is compared against a variable voltage reference $KV_{REF}$ 302 to produce a digital stream of comparison data 214. The value "K" of the voltage reference $KV_{REF}$ 302 is a variable, which is adjustable through the adjust signal 234. A suitable variable voltage reference may be constructed in accordance with the teachings of U.S. Pat. No. 6,859,156, issued Feb. 22, 2005, and titled VARIABLE BANDGAP REFERENCE AND APPLICATIONS THEREOF, which is hereby incorporated by reference.

Figure 4:
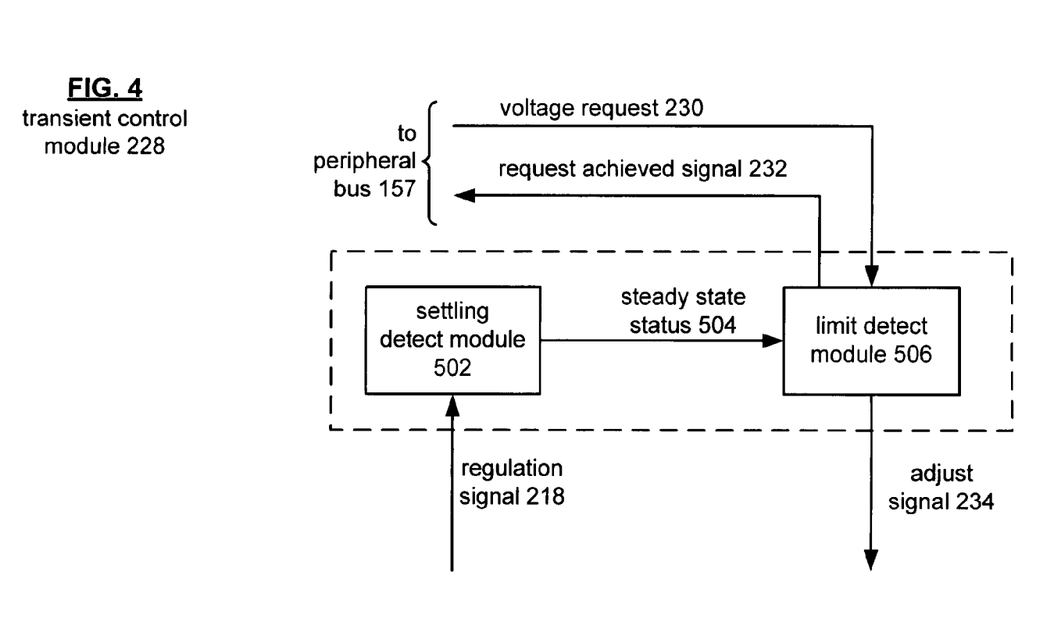
FIG. 4 is a schematic block diagram of an embodiment of the transient control module in accordance with the present invention.

FIG. 4 is a block schematic diagram of the transient control module 228, which includes a settling detect module 502 and a limit detect module 506. The settling detect module 502 is operably coupled to monitor the regulation signal 218 for each change of the adjust signal 234, as is discussed in greater detail with reference to FIGS. 6 and 7, to determine when the output voltage 204 substantially reaches a steady state. When the output voltage substantially reaches a steady state, the settling detect module 502 provides a steady state status 506 to the limit detect module 506.

The limit detect module 506 is operably coupled to provide an adjust signal 234 based on the voltage request 230 and the steady state status 504. In general, when the power supply 200 substantially achieves a steady state condition as indicated through the steady state status 504 for a present output voltage adjustment, the limit detect module 506 determines whether the output voltage 204 (see FIG. 2) has reached its desired new setting as indicated by the voltage request 230. When the output voltage 204 is not at the desired new setting, the limit detect module 506 provides another adjust signal 234 to further adjust the feedback loop of the DC-DC converter such that the output voltage is adjusted to a new present output voltage (for example, change the divider value of feedback network 202 such that the output voltage is adjusted up or down by approximately 30 milli-volts, or some other small voltage value). This process is repeated until the output voltage 204 is at the desired output voltage setting as indicated by the voltage request 230. When the output voltage reaches the desired output voltage setting, the limit detect module 506 generates the request achieved signal 232, which is provided to the processing core. As such, the transient control module 228, in response to a change voltage request from the processing core 102, adjusts and monitors the output voltage 204, off-loading this task from the processing core 102 (see FIG. 1).

Figure 5:
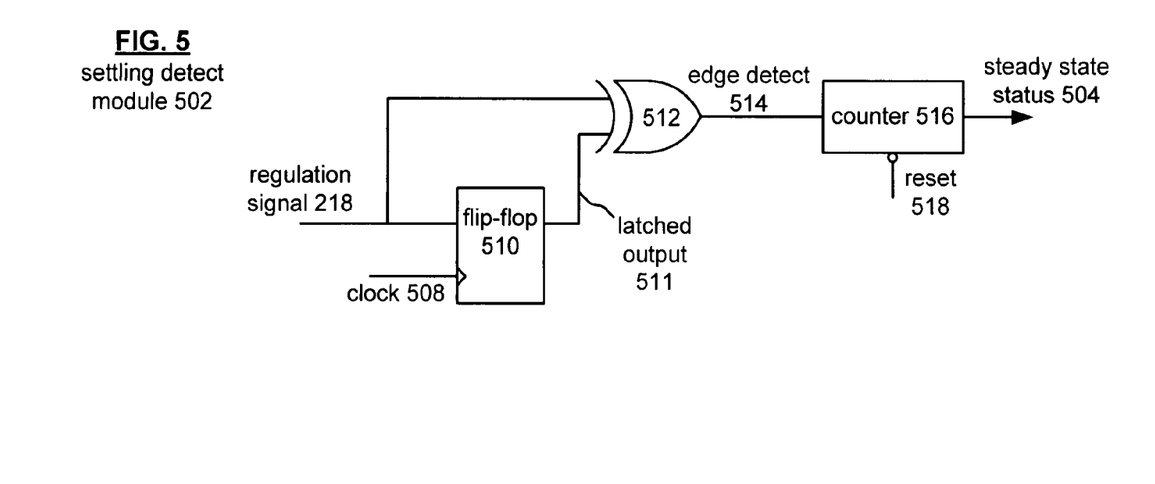
FIG. 5 is a schematic block diagram of a settling detect circuit in accordance with the present invention.

FIG. 5 is a block schematic diagram of the settling detect module 502, which includes a flip-flop 510, a NOR gate 512, and a counter 516. The flip-flop 510 is operably coupled to receive the regulation signal 218 and a clock 508 to provide a latched output 511 from the regulation signal 218. The NOR gate 512 receives the regulation signal 218 and the latched output 511 to provide an edge detect 514. The counter 516 receives the edge detect 514. When the counter 516 accrues a predetermined value, the counter provides the steady state status 504. When the counter 516 provides the steady state status 504, the reset 518 resets the counter 516.

In operation, the settling detect module 502 monitors the feedback loop of the power supply 200 via the regulation signal 218, which is the output of the filter module 216 (see FIG. 2). The regulation signal 218 provides state or sign changes between a "–1" and a "+1" level. The sign changes allow the settling detect module 502 to monitor the feedback loop of the power supply 200 for state transitions, or transition edges. The transitions are sensed by the flip-flop 510 and the NOR gate 512 and provided through the edge detect 514. The counter 516 counts the number of transitions to a predetermined value, which is indicative of substantially achieving a steady state of the present output voltage resulting from an adjustment to the feedback loop. The predetermined value is based on the magnitude of the step adjust value used to adjust the feedback loop. For example, a suitable step adjust value that minimizes transients for cleaner transitions and overshoot/undershoots with respect to the voltage request 230, such as a 32 milli-volt step adjust value. For a 32 milli-volt step adjust value, for example, a suitable corresponding predetermined value, or count, is "three" transitions, after which the power supply 200 substantially achieves a steady-state condition. The predetermined amount is selected to provide a predictable transient response of the power supply 200, which can be used to decide whether another adjustment is needed. Also, the predetermined amount may vary with respect to the power requirements for a selected application.

Figure 6:
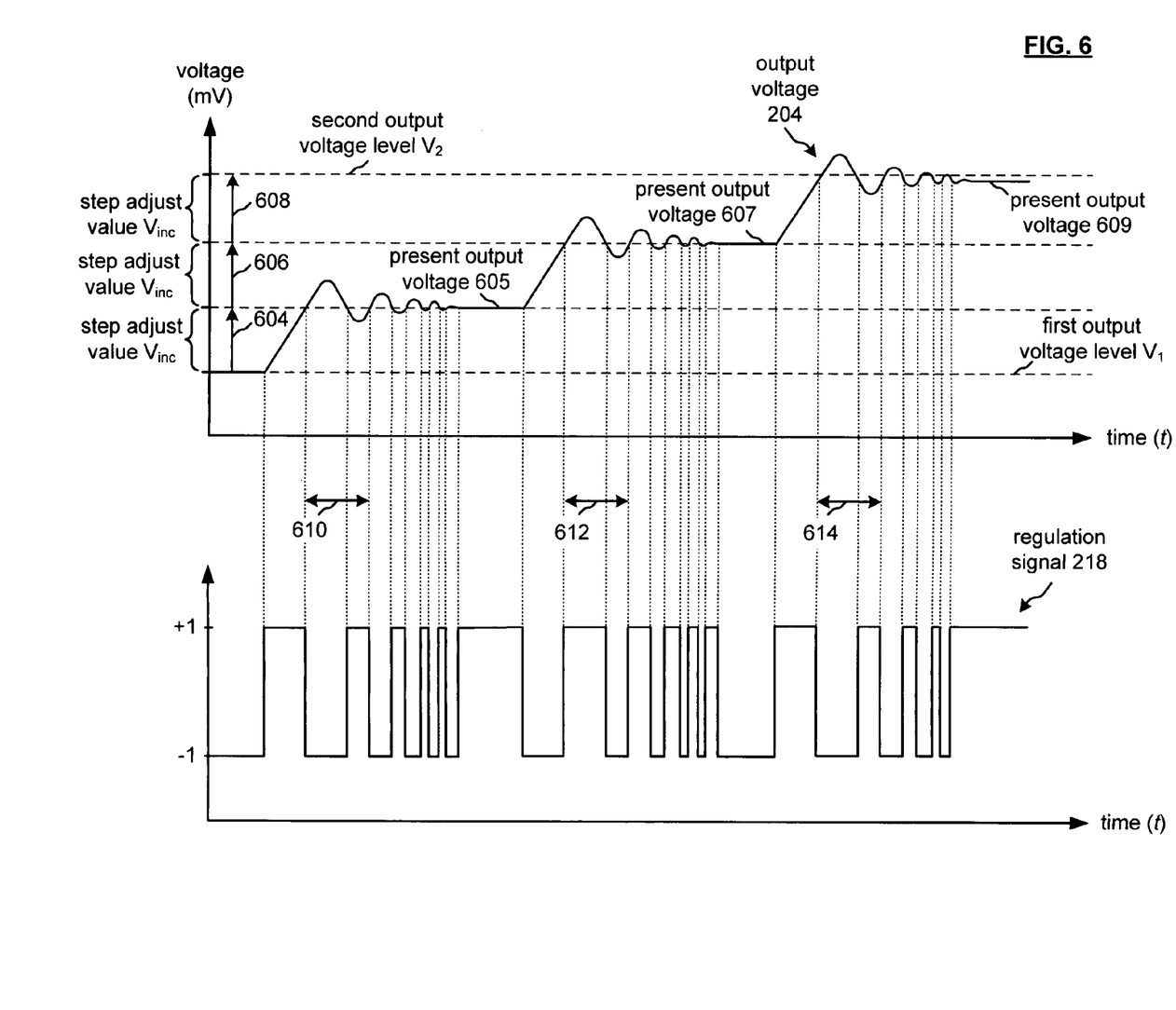
FIG. 6 is a waveform diagram of a filter output when an adjustment is applied to an output voltage in accordance with the present invention.

FIG. 6 is a waveform diagram illustrating the regulation signal 218 and the output voltage 204 when adjust signals 234 are provided to the adjustable feedback module 225. In this example, the output voltage 204 is being adjusted from a first output voltage level $V_1$ to a second output voltage level $V_2$. To achieve this voltage change, three monotonic step adjust values are used. As one of ordinary skill in the art will appreciate, the number of steps for adjusting the output voltage depends on the difference between the first and second voltages, the bandwidth of the DC-DC converter, the desired settling time, and/or output voltage ripple requirements.

For the first adjustment 604, a first adjust signal 234 is provided to the adjustable feedback module 225 as indicated by step adjust value $V_{inc}$, to produce a present output voltage 605. The adjustment of the output voltage 204 produces a transient response—a short-lived oscillation caused by a sudden change of voltage, current, or load.

As shown, the regulation signal 218 presents state changes when a sign change or transition is noted from the filtered output of the comparator module 208 (see FIG. 2). A sign change is noted on transition from one-or-the-other of the "+1" and the "–1" levels of the waveform regulation signal 218, which is output by the filter module 216 (see FIG. 2). When an adjustment occurs, the feedback loop is monitored for a period 610 over a number of state changes of the regulation signal 218 via the settling detect module 502 (see FIGS. 4 and 5).

With the passage of the period count 610, the power supply substantially achieves a steady-state condition. When the power supply substantially achieves the steady-state condition, the determination is made whether the present output voltage 605 corresponds to the second output voltage level $V_2$. When the present output voltage does not correspond to the second output voltage level, the process of adjusting, monitoring, and determining is repeated.

Accordingly, the feedback loop of the power supply is adjusted by the step adjust value $V_{inc}$ for adjustment 606 to produce the present output voltage 607. The feedback loop is monitored for the present adjustment 606 to determine when the power supply substantially achieves a steady-state condition. For the step adjust value $V_{inc}$ used, the feedback loop is monitored over a period count 612 to substantially achieve a steady-state condition, upon which the determination is made whether the present output voltage 607 corresponds to the second output voltage level $V_2$. As shown, the present output voltage 607 is not within the applicable range with respect to the second output voltage level V2. In this example, the present output voltage does not correspond to the second output voltage level, and the process of adjusting, monitoring, and determining is repeated with the step adjust value $V_{inc}$ for adjustment 608.

In this instance, the feedback loop of the power supply is adjusted by the step adjust value $V_{inc}$ at adjustment 608 to produce the present output voltage 609. The feedback loop is monitored for the present adjustment 608 to determine when the power supply substantially achieves a steady-state condition. For the step adjust value $V_{inc}$ used, the feedback loop is monitored over a period count 614 to substantially achieve a steady-state condition, upon which the determination is made whether the present output voltage 609 corresponds to the second output voltage level $V_2$. With the present output voltage 609 corresponding to the second output voltage level $V_2$, the transient module may provide an indication that the voltage request has been achieved via the request achieved signal 232 (see FIG. 2).

Note that although the adjustment process of FIG. 6 is illustrated with increasing monotonic adjustments 604, 606, and 608 to produce an output voltage 204 at a desired higher voltage, decreasing adjustments may be similarly made to produce an output voltage 204 at a desired lower voltage.

Figure 7:
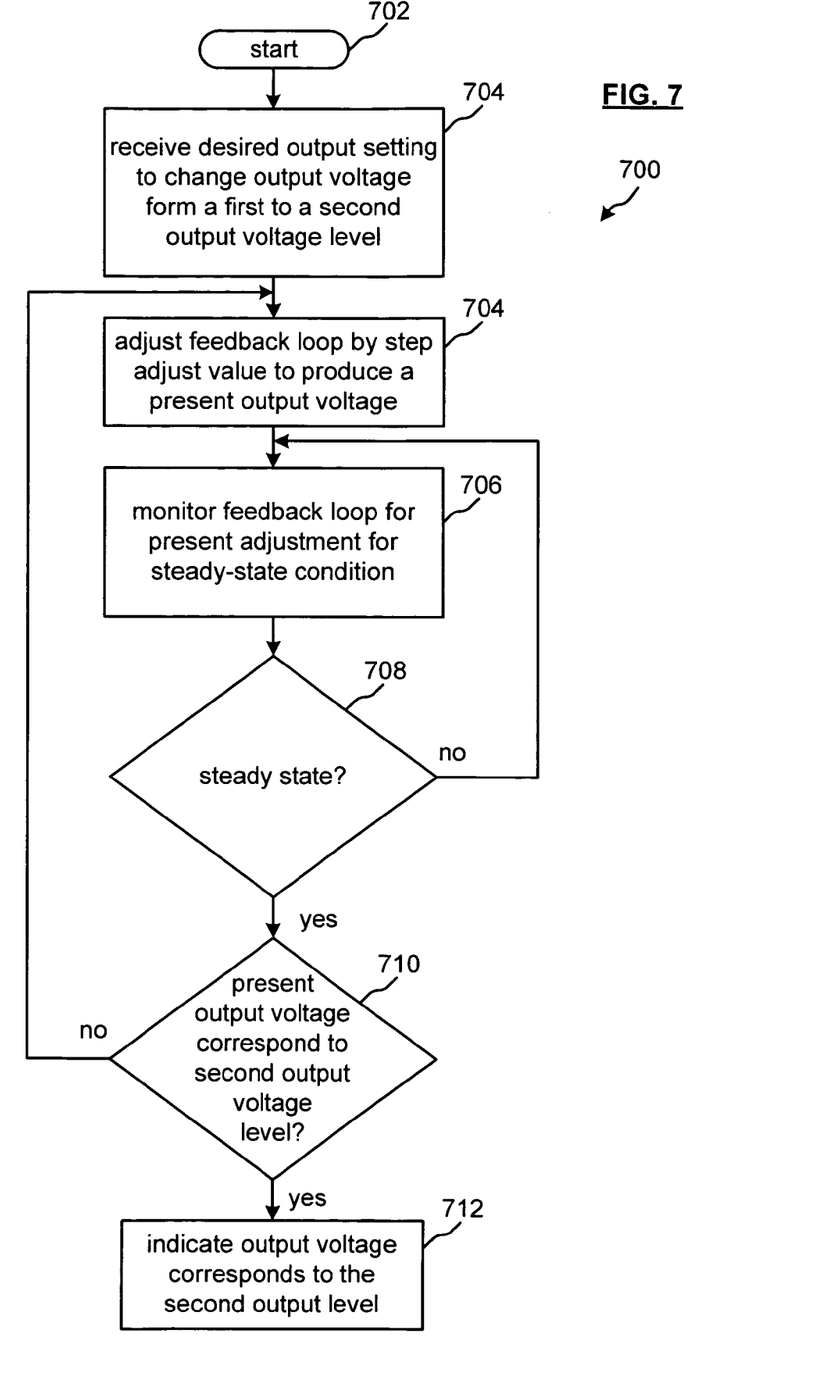
FIG. 7 is a flow diagram of a method for adjusting an output voltage of a power supply in accordance with the present invention.

FIG. 7 is a flow diagram 700 illustrating the operation of the transient control module that begins at step 702. At step 704, a desired output voltage setting is received to change the output voltage from a first output voltage level to a second output voltage. The second output voltage may be up or down with respect to the first output voltage. At step 704, in response to the receiving the desired output voltage setting, the feedback loop of the power supply is adjusted by a step adjust value to produce a present output voltage Upon the adjustment, the feedback loop is monitored for a present step adjustment to determine when the power supply substantially achieves a steady-state condition at step 706. At step 708, a determination is made as to whether the power substantially achieves a steady-state condition. If not, such as when the number of state changes (or transitions) have yet to occur, then the monitoring continues at step 706; otherwise, at step 710, a determination is made as to whether the present output voltage corresponds to the second output voltage level. When it does not, then the process repeats the adjusting, the monitoring, and the determining via steps 704, 706, 708, and 710. Otherwise, when the present output voltage corresponds to the second output voltage level, at step 712 the process indicates that the present output voltage corresponds to the second output voltage level.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level and/or voltage level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal. While the transistors or switches in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), n-well transistors, p-well transistors, enhancement mode, depletion mode, and zero voltage threshold (VT) transistors.

The preceding discussion has presented a method and apparatus power supply adjustment with increased slewing in providing an adjustment with monitoring for a steady state following the adjustment. In general, this is achieved by a transient control module operably coupled to provide an adjust signal based on a desired voltage input to change the output voltage from a first output voltage to a second output voltage, and when the power supply substantially achieves a steady state, determining whether a present output voltage corresponds with the second voltage.

Therefore, a need exists for a method and apparatus for power supply adjustment with increased slewing having minimal processor oversight and improved response to efficiently accommodate power requirements.

What is claimed is:

1. A method for adjusting an output voltage of a power supply comprises:
   receiving a desired output voltage setting to change the output voltage from a first output voltage level to a second output voltage level;
   in response to receiving the desired output voltage setting, adjusting a feedback loop of the power supply by a step adjust value to produce a regulation signal;
   switching a switching circuit coupled to an inductor in accordance with the regulation signal such that energy is transferred from the inductor to a load to produce a present output voltage;
   monitoring the feedback loop for a present adjustment to determine when the power supply substantially achieves a steady-state condition;
   when the power supply substantially achieves a steady-state condition, determining whether the present output voltage corresponds to the second output voltage level; and
   when the present output voltage does not correspond to the second output voltage level, repeating the adjusting, the switching, the monitoring, and the determining steps.

2. The method of claim 1 further comprises:
   when the present output voltage corresponds to the second output voltage level, indicating that the output voltage is at the second output voltage level.

3. The method of claim 1 further comprises determining the steady state condition based on when a transient of the present adjustment has oscillated over a predetermined number of periods.

4. The method of claim 1 wherein the adjusting the feedback loop comprises adjusting a resistive value of a resistive divider network.

5. The method of claim 1 wherein the adjusting the feedback loop comprises adjusting a comparative voltage reference.

6. The method of claim 1 wherein the step adjust value comprises a monotonic value.

7. A power supply comprises:
   a switching circuit operably coupled to an inductor, wherein the switching circuit is switched in accordance with a regulation signal such that energy is transferred from the inductor to a load to produce an output voltage;
   an adjustable feedback module operably coupled to produce the regulation signal based on the output voltage; and
   a transient control module operably coupled to adjust the adjustable feedback module to achieve a desired output voltage setting by changing the output voltage from a first output voltage level to a second output voltage level, wherein the transient control module is further operably coupled to, in response to receiving the desired output voltage setting,
   adjust the adjustable feedback module by a step adjust value to produce a present output voltage;
   monitor the adjustable feedback module for a present adjustment to determine when the power supply substantially achieves a steady-state condition;
   when the power supply substantially achieves the steady-state condition, determining whether the present output voltage corresponds to the second output voltage level; and
   when the present output voltage does not correspond to the second output voltage level, repeat the adjust, the monitor, and the determine steps.

8. The power supply of claim 7 wherein the transient control module is further operably coupled to, when the present output voltage corresponds to the second output voltage level, indicate that the output voltage is at the second output voltage level.

9. The power supply of claim 7 wherein the steady state condition is based on when a transient of the present adjustment has oscillated over a predetermined number of periods.

10. The power supply of claim 7 wherein the adjustable feedback module further comprises an adjustable resistive divider network.

11. The power supply of claim 7 wherein the adjustable feedback module further comprises an adjustable comparative voltage reference.

12. The power supply of claim 7 wherein the step adjust value comprises a monotonic value.

13. A comprehensive system-on-a-chip comprises:
a processing core operably coupled to process input digital data and produce therefrom output digital data;
mixed signal circuitry operably coupled to convert input analog signals into the input digital data and to convert the output digital data into output analog signals; and
a power supply that includes a DC-DC converter and a transient control module, wherein the DC-DC converter is operably coupled to convert a battery voltage into a supply voltage that supplies at least one of: the processing core and the mixed signal circuitry, wherein the transient control module functions to:
  receive a desired output voltage setting to change the supply voltage from a first output voltage level to a second output voltage level;
  in response to receiving the desired output voltage setting,
    adjust a feedback loop of the DC-DC converter by a step adjust value to produce a present output voltage;
    monitor the feedback loop for a present adjustment to determine when the power supply substantially achieves a steady-state condition;
    when the power supply substantially achieves the steady-state condition, determine whether the present output voltage corresponds to the second output voltage level; and
    when the present output voltage does not correspond to the second output voltage level, repeating the adjust, the monitor, and the determine steps.

14. The comprehensive system-on-a-chip of claim 13 wherein the transient control module is further operably coupled to, when the present output voltage corresponds to the second output voltage,
indicate that the supply voltage is at the second output voltage level.

15. The comprehensive system-on-a-chip of claim 13 wherein the transient control module is further operably coupled to monitor the feedback loop for a present adjustment to determine when the power supply substantially achieves the steady-state condition comprises:
determining the steady state condition based on when a transient of the present adjustment has oscillated over a predetermined number of periods.

16. The comprehensive system-on-a-chip of claim 13 wherein the transient control module is further operably coupled to adjust the feedback loop of the DC-DC converter by the step adjust value to produce the present output voltage comprises:
adjusting a resistive value of a resistive divider network.

17. The comprehensive system-on-a-chip of claim 13 wherein the transient control module is further operably coupled to adjust the feedback loop of the power supply by the step adjust value to produce the present output voltage comprises:
adjusting a comparative voltage reference.

18. The comprehensive system-on-a-chip of claim 13 wherein the step adjust value comprises a monotonic value.

* * * * *